United States Patent
Kai et al.

(10) Patent No.: US 7,400,721 B2
(45) Date of Patent: Jul. 15, 2008

(54) PIVOT APPARATUS AND METHOD THEREOF

(75) Inventors: Hu-Chih Kai, Taipei (TW); Ming-Chang Shih, Keelung (TW)

(73) Assignee: Asustek Computer Inc., Taipei (TW)

( * ) Notice: Subject to any disclaimer, the term of this patent is extended or adjusted under 35 U.S.C. 154(b) by 868 days.

(21) Appl. No.: 10/932,064

(22) Filed: Sep. 2, 2004

(65) Prior Publication Data

US 2005/0223523 A1    Oct. 13, 2005

(30) Foreign Application Priority Data

Mar. 23, 2004    (TW) .............................. 93107760 A (51) Int. Cl.
H04M 1/00        (2006.01)
H04M 9/00        (2006.01)

(52) U.S. Cl. .............................. 379/433.13; 379/433.11; 455/575.1

(58) Field of Classification Search ............ 379/433.13, 379/433.11, 433.01, 428.01; 455/90.3, 575.1; 16/221, 330, 303
See application file for complete search history.

(56) References Cited

U.S. PATENT DOCUMENTS

| | | | | |
|---|---|---|---|---|
| 5,075,929 A * | 12/1991 | Chung | ......................... | 16/342 |
| 6,950,686 B2 * | 9/2005 | Won | ......................... | 455/575.3 |
| 7,171,247 B2 * | 1/2007 | Han | ......................... | 455/575.3 |
| 2001/0036265 A1 * | 11/2001 | Oh | ......................... | 379/433.01 |
| 2006/0162122 A1 * | 7/2006 | Satoh et al. | .................. | 16/221 |

* cited by examiner

*Primary Examiner*—Curtis Kuntz
*Assistant Examiner*—Tuan D Nguyen
(74) *Attorney, Agent, or Firm*—Birch, Stewart, Kolasch & Birch, LLP (57) ABSTRACT

A pivot apparatus. The pivot apparatus includes a first member, a hinge body, a hinge head, a second member and a base member. The first member has a hinge receiving portion. The hinge body is movably disposed in the hinge receiving portion. The hinge head is connected to the hinge body. The second member is rotatably disposed on the first member and has a first fitting hole to receive the hinge head. The base member is disposed under the first member and has a retardant portion. The hinge body is stopped by the retardant portion such that the hinge head connected thereto is received in the first fitting hole.

8 Claims, 8 Drawing Sheets

PIVOT APPARATUS AND METHOD THEREOF

This Non-provisional application claims priority under 35 U.S.C. §119 (a) on patent application Ser. No(s). 093107760 filed in Taiwan, Republic of China on Mar. 23, 2004, the entire contents of which are hereby incorporated by reference.

BACKGROUND OF THE INVENTION

1. Field of the Invention

The present invention relates to a pivot apparatus, and in particular to a pivot apparatus that is easily assembled.

2. Description of the Related Art

Generally speaking, many devices are composed of two members rotating relatively, such as cellular phones and portable computers. Thus, hinge structures usually exist in these devices.

Figure 1A:
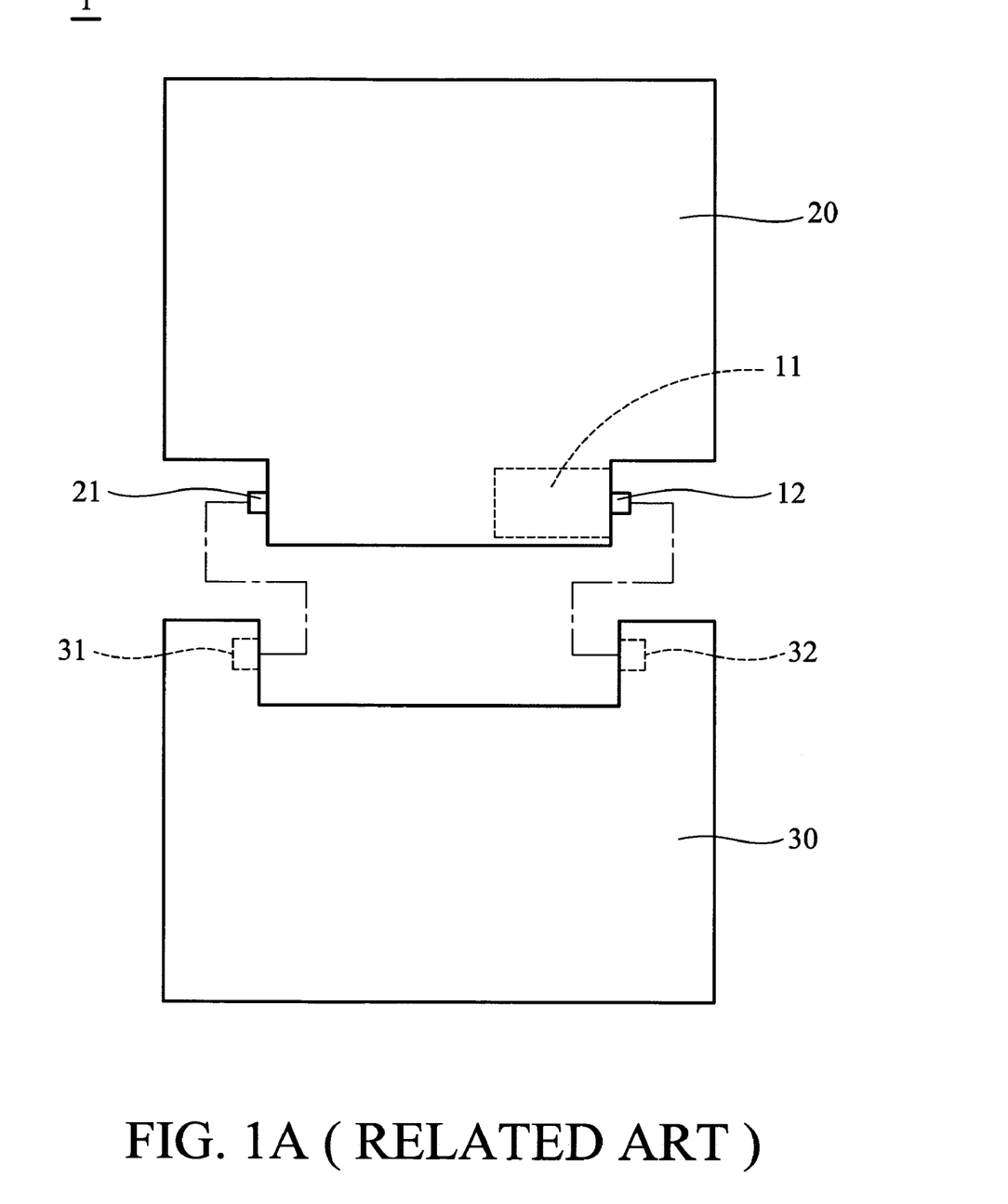
FIG. 1A is a schematic exploded view showing a conventional pivot device.
Figure 1B:
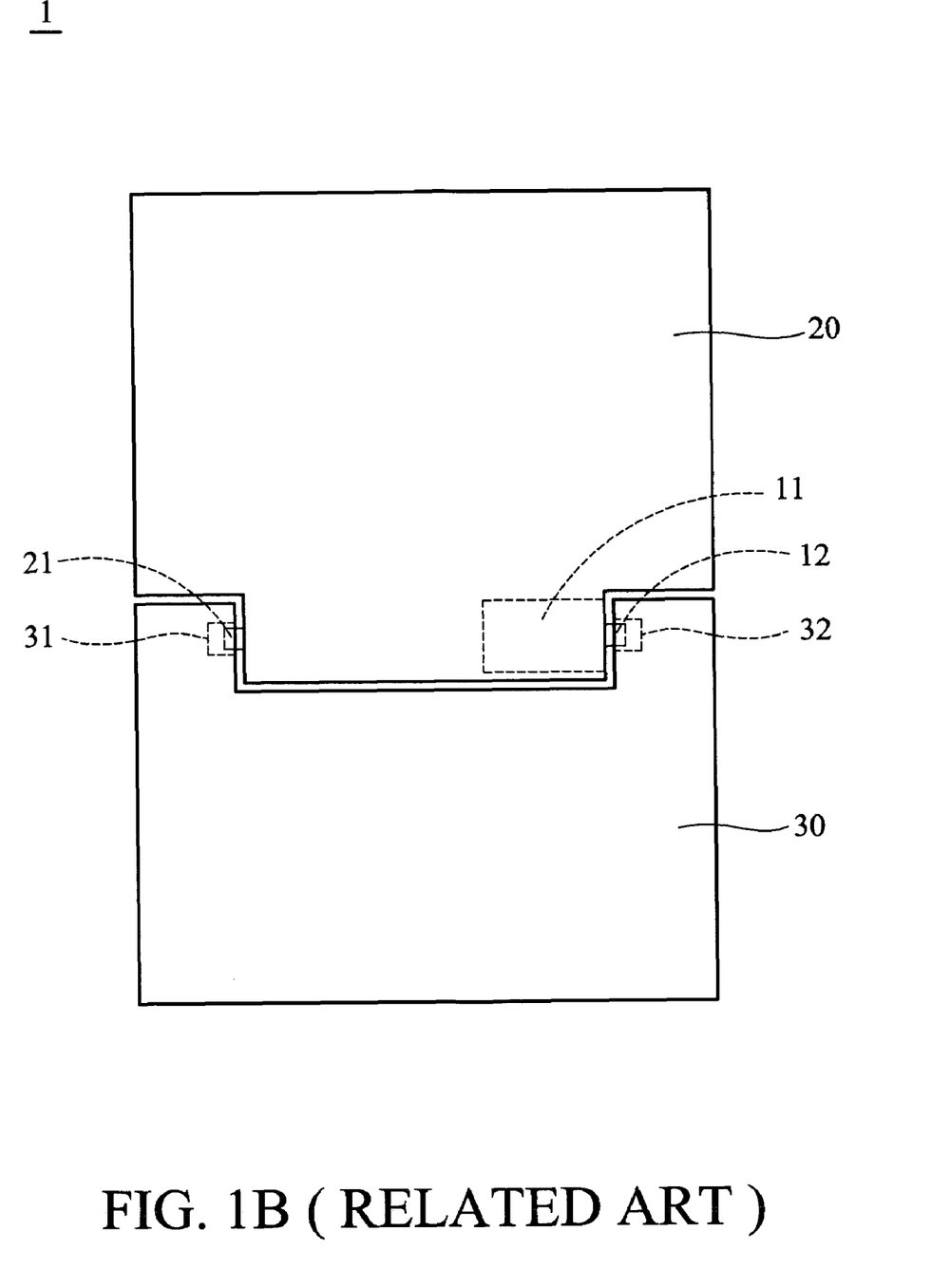
FIG. 1B is a schematic assembly view according to FIG. 1A.

Referring to FIG. 1A, a conventional pivot device 1 is composed of a first member 20, a second member 30, a hinge body 11 and a hinge head 12. The hinge head 12 is flexibly connected to the hinge body 11. When the first member 20 and second member 30 are assembled, the hinge body 11 is placed in the first member 20 and the hinge head 12 connected thereto protrudes from the first member 20. A rotating end 21 of the first member 20 is then placed in a recess 31 of the second member 30. The hinge head 12 is pressed to retract in the hinge body 11. Then, the hinge head 12 slides on the second member 30. The hinge head 12 ejects from the hinge body 11 and is received in another recess 32 of the second member 30 until it slides into the recess 32, as shown in FIG. 1B. At this point, assembly of the pivot device 1 is complete and the first member 20 and second member 30 can rotate relatively.

The pivot device 1, however, has many drawbacks. During assembly of the pivot device 1, great force is required to push the hinge head 12 into the hinge body 11. The hinge head 12 scrapes the second member 30 or causes damage to the surface thereof when sliding on the second member 30. Further, an opening (not shown) must be formed on the first member 20 to separate the first member 20 from the second member 30. Namely, the hinge head 12 is pulled back through the opening, such that it can retract in the hinge body 11 and the first member 20 and second member 30 are then separated. Nevertheless, the opening presents an unpleasing appearance and increases difficulty in manufacturing the first member 20.

Hence, there is a need to provide an improved pivot apparatus to overcome the aforementioned problems. Specifically, the assembly of the present pivot apparatus is simplified and the surface thereof is not scraped or damaged during assembly.

SUMMARY OF THE INVENTION

Accordingly, an object of the invention is to provide a pivot apparatus. The pivot apparatus comprises a first member, a hinge body, a hinge head, a second member and a base member. The first member has a hinge receiving portion. The hinge body is movably disposed in the hinge receiving portion. The hinge head is connected to the hinge body. The second member is rotatably disposed on the first member and has a first fitting hole to receive the hinge head. The base member is disposed under the first member and has a retardant portion. The hinge body is stopped by the retardant portion such that the hinge head connected thereto is received in the first fitting hole.

The first member further comprises a rotating shaft opposite to the hinge receiving portion and the second member further comprises a second fitting hole opposite to the first fitting hole. The rotating shaft is received in the second fitting hole.

The second member further comprises an operation interface disposed thereon. The operation interface may be a keypad module.

The hinge body further comprises a spring disposed therein and connected to the hinge head.

Another object of the invention is to provide a pivoting method for a first member and a second member. The pivoting method comprises the steps of: (a) placing a hinge body into a hinge receiving portion of the first member, wherein the hinge body moves inside the first member; (b) aiming a rotating shaft of the first member at a second fitting hole of the second member and fitting the rotating shaft into the second fitting hole; (c) aiming the hinge receiving portion of the first member at a first fitting hole of the second member; (d) pushing the hinge body in the hinge receiving portion toward the first fitting hole of the second member such that a hinge head connected to the hinge body moves into the first fitting hole; and (e) fitting a base member on the bottom of the first member so that a retardant portion of the base member stops the hinge body, wherein the hinge head is received in the first fitting hole.

The steps (b) and (c) are performed simultaneously.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 2A:
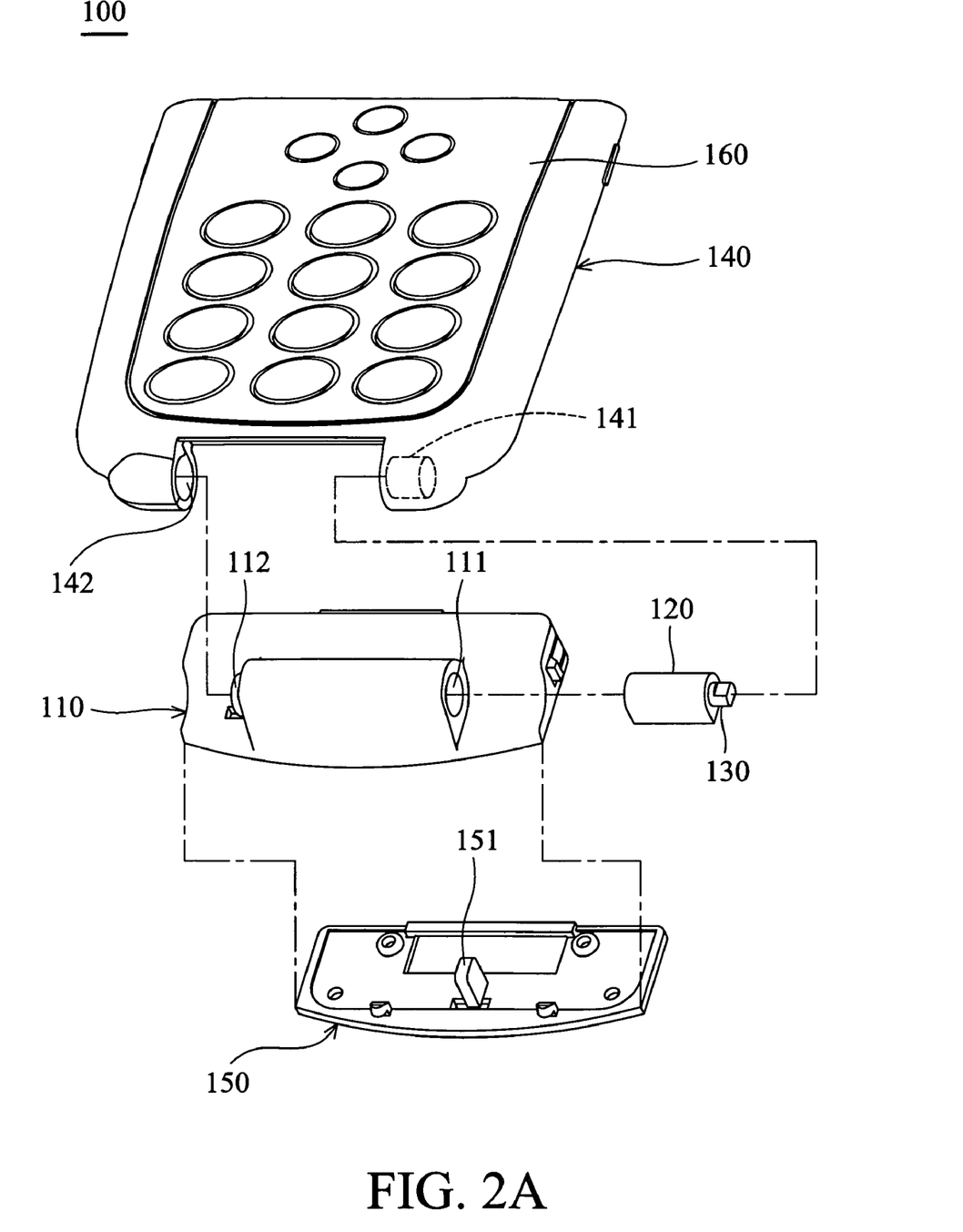
FIG. 2A is a schematic exploded perspective view showing the pivot apparatus of the invention.
Figure 2B:
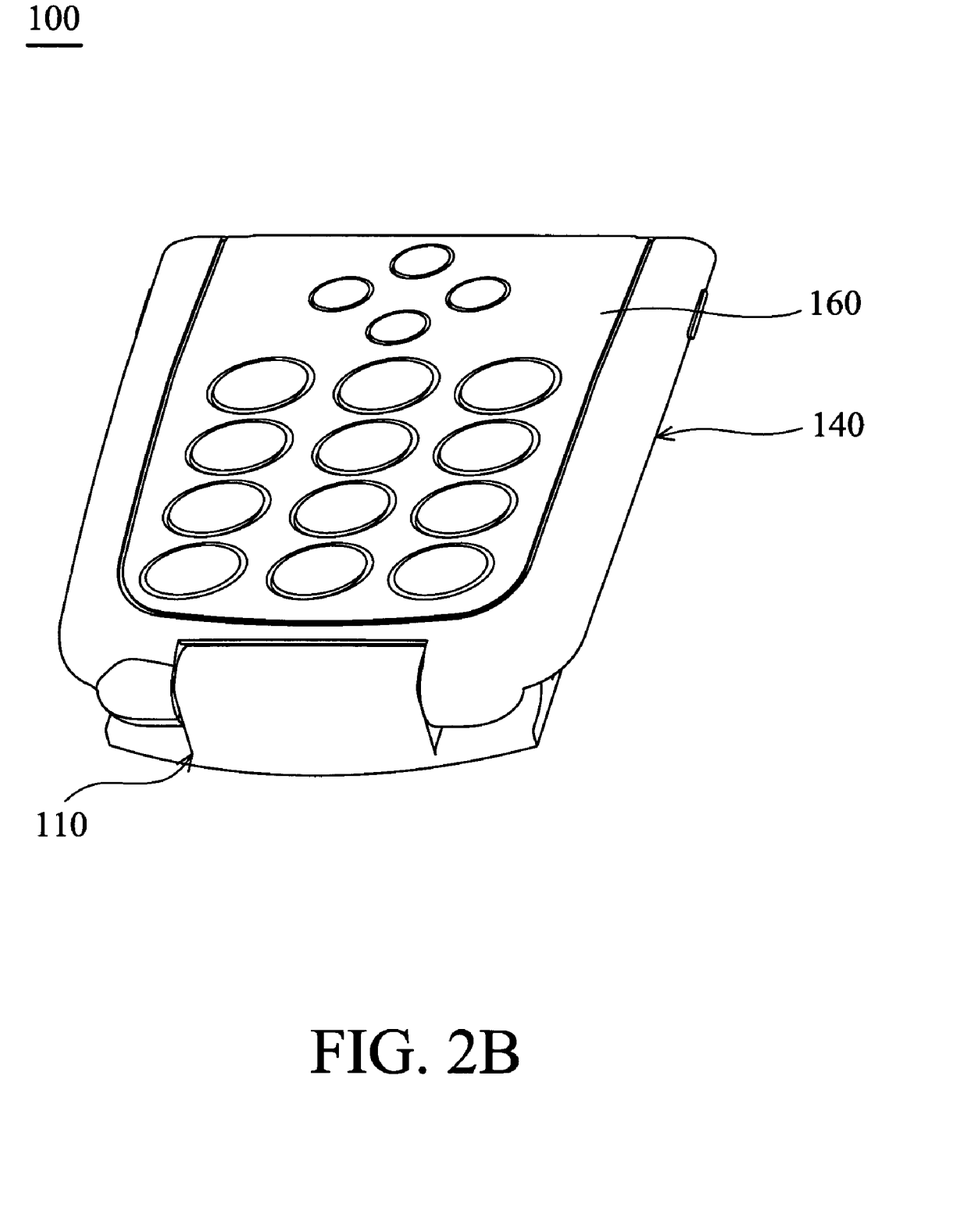
FIG. 2B is a schematic assembly perspective view showing the pivot apparatus of the invention.

Referring to FIG. 2A and FIG. 2B, the pivot apparatus 100 is composed of a first member 110, a hinge body 120, a hinge head 130, a second member 140 and a base member 150.

As shown in FIG. 2A, the first member 110 comprises a hinge receiving portion 111 and a rotating shaft 112 opposite thereto.

The hinge body 120 is movably disposed in the hinge receiving portion 111. Namely, the hinge body 120 moves backward and forward in the hinge receiving portion 111. The hinge head 130 is connected to the hinge body 120, and the hinge head 130 protrudes by the hinge receiving portion 111.

The second member 140 is rotatably disposed on the first member 110. Specifically, the second member 140 has a first fitting hole 141 and a second fitting hole 142 opposite thereto, as shown in FIG. 2A. When the second member 140 is rotatably disposed on the first member 110, the rotating shaft 112 is received in the second fitting hole 142 and the hinge head 130 is received in the first fitting hole 141.

The base member 150 is disposed under the first member 110 and has a retardant portion 151. When the second member 140 is rotatably disposed on the first member 110, the retardant portion 151 stops the hinge body 120 to prevent the hinge body 120 from moving by fixing the retardant portion 151 with the hinge body 120. Thus, the hinge head 130 connected to the hinge body 120 is precisely received in the first fitting hole 141.

The following description is directed to the assembly of the pivot apparatus 100.

Figure 3:
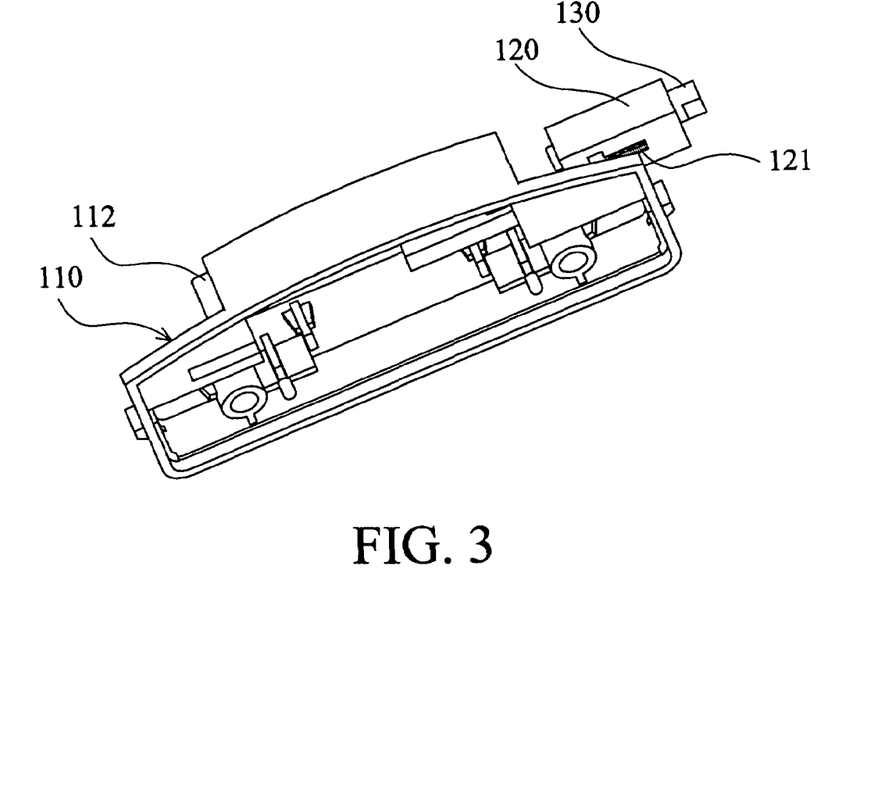
FIG. 3 is a schematic view showing the assembly between the first member and the hinge body of the pivot apparatus of the invention.
Figure 4:
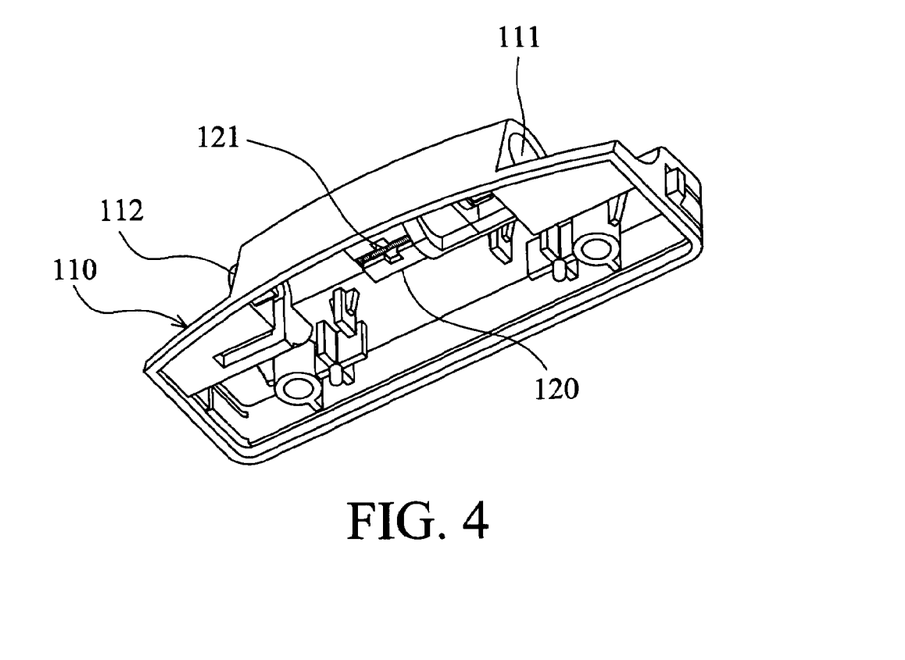
FIG. 4 is a schematic view showing the assembly according to FIG. 3.
Figure 5:
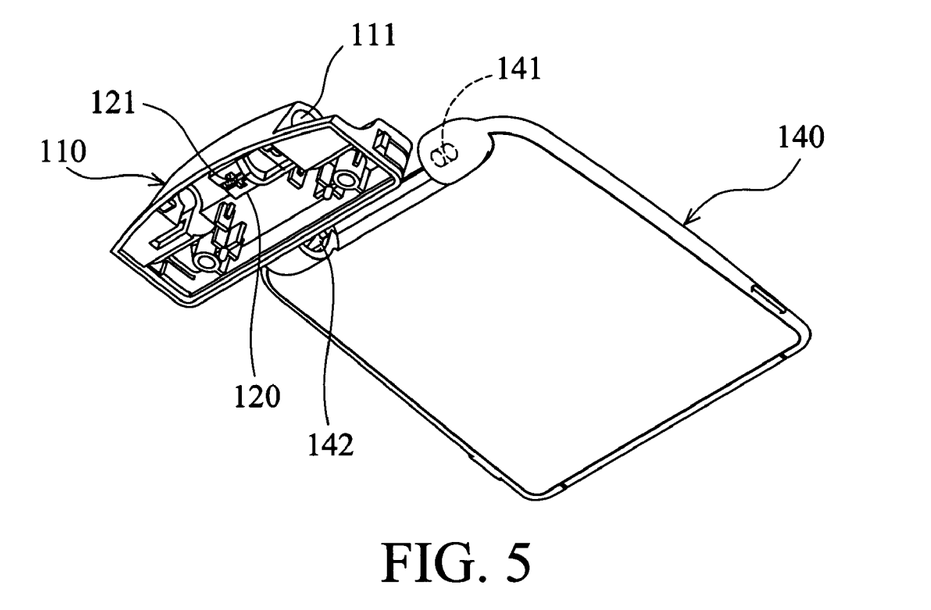
FIG. 5 is a schematic view showing the assembly between the first member and the second member of the pivot apparatus of the invention.
Figure 6:
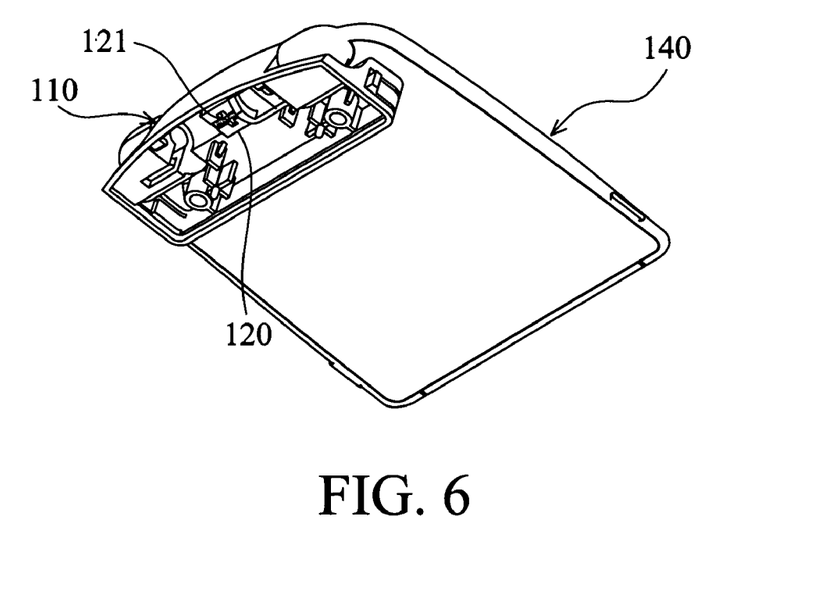
FIG. 6 is a schematic view showing the assembly according to FIG. 5.
Figure 7:
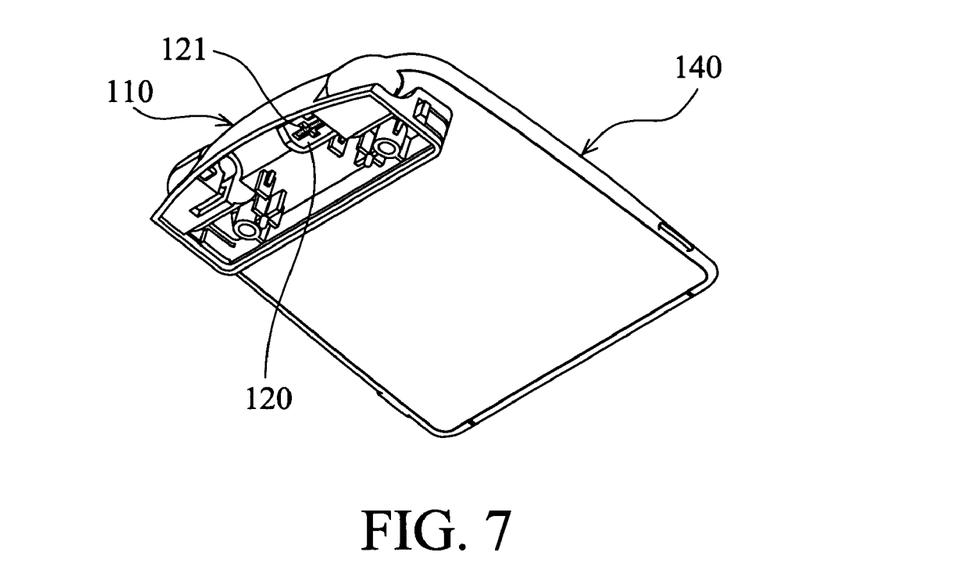
FIG. 7 is a schematic view showing the assembly according to FIG. 6.
Figure 8:
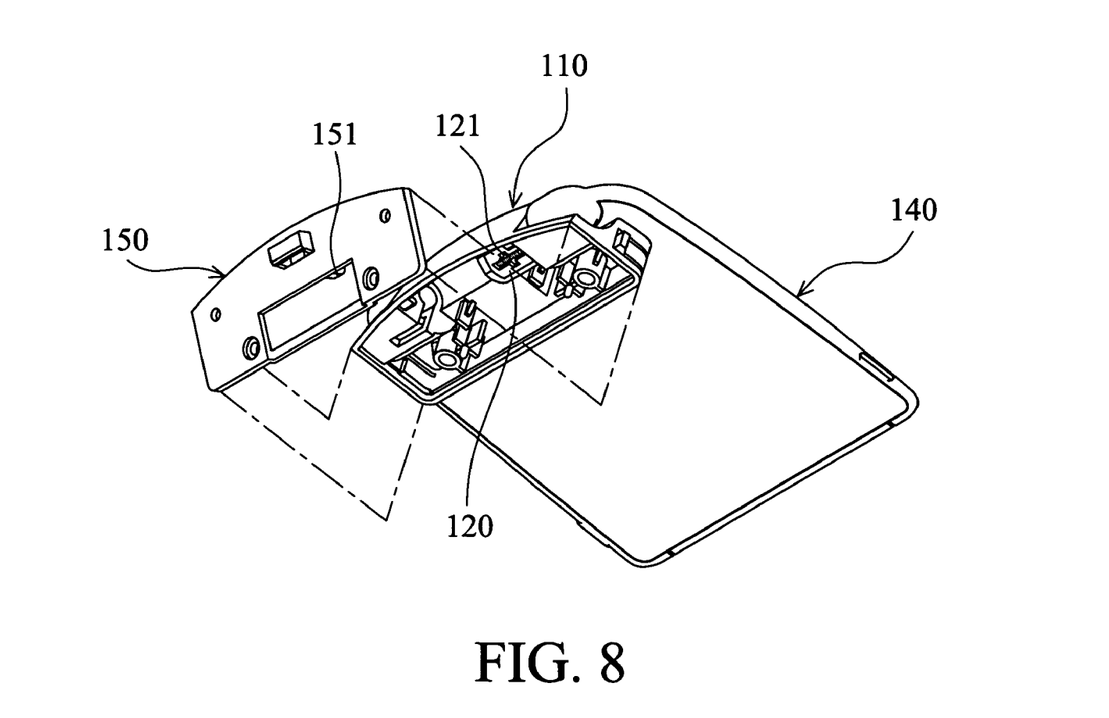
FIG. 8 is a schematic view showing the assembly of the first member, second member and base member of the pivot apparatus of the invention.
Figure 9:
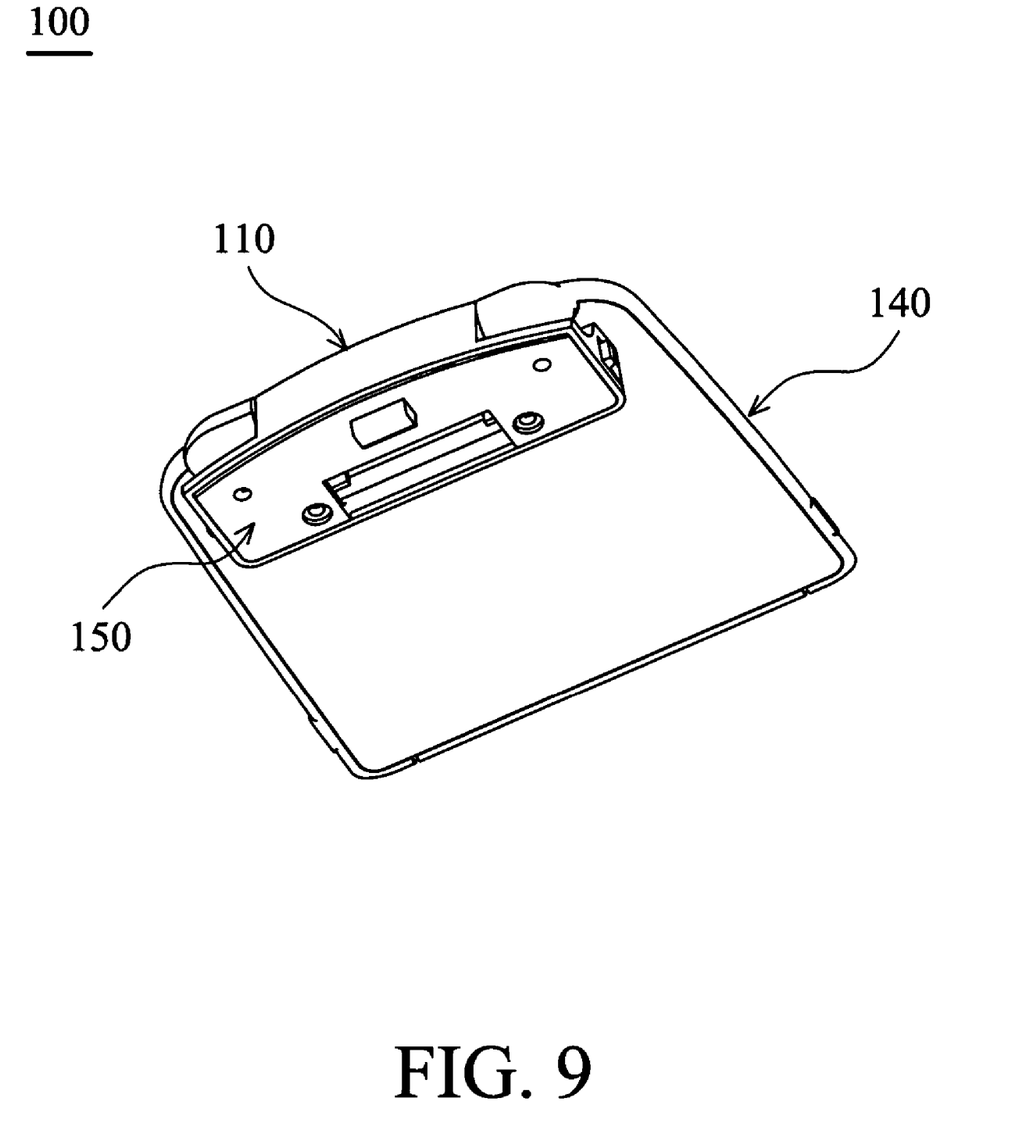
FIG. 9 is another schematic assembly perspective view showing the pivot apparatus of the invention.

Referring to FIG. 3 and FIG. 4, the hinge body 120 is placed in the hinge receiving portion 111. At this point, the hinge body 120 can move inside the first member 110. As shown in FIG. 5 and FIG. 6, the rotating shaft 112 of the first member 110 is aimed at the second fitting hole 142 of the second member 140. Also, the hinge receiving portion 111 of the first member 110 is aimed at the first fitting hole 141 of the second member 140. The rotating shaft 112 is then fitted into the second fitting hole 142. In another aspect, the hinge receiving portion 111 of the first member 110 is aimed at the first fitting hole 141 of the second member 140. As shown in FIG. 7, the hinge body 120 in the hinge receiving portion 111 is pushed toward the first fitting hole 141 such that the hinge head 130 connected to the hinge body 120 moves into the first fitting hole 141. As shown in FIG. 8, the base member 150 is fitted on the bottom of the first member 110. Specifically, the retardant portion 151 on the base member 150 stops the hinge body 120 and the hinge head 130 is precisely received in the first fitting hole 141, as shown in FIG. 2A and FIG. 8. At this point, the assembly of the pivot apparatus 100 is completed, as shown in FIG. 9 and FIG. 2B.

In another aspect, when the pivot apparatus 100 is disassembled, a user can remove the base member 150 and push the hinge body 120 toward the second fitting hole 142. At this point, the hinge head 130 is withdrawn from the first fitting hole 141 and the first member 110 can be separated from the second member 140.

Moreover, the assembly and disassembly of the pivot apparatus 100 are simplified. Thus, none of the members of the pivot apparatus 100 are scraped or damaged during assembly and disassembly.

Additionally, the second member 140 may have an operation interface 160 disposed thereon. When the pivot apparatus 100 serves as a cellular phone structure, the operation interface 160 can be a keypad module.

Specifically, the first member 110 and second member 140 in the pivot apparatus 100 are not limited to the shapes shown in FIGS. 2A to 9. Namely, the shapes of the first member 110 and second member 140 may be modified to meet the actual requirements of the pivot apparatus 100.

Further, as shown in FIGS. 3 to 8, the hinge body 120 has a spring 121 disposed therein. The spring 121 is connected to the hinge head 130 such that the hinge head 130 can flexibly move in the hinge body 120.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pivot apparatus for a portable electronic device, comprising:
    a first member comprising a hinge receiving portion;
    a hinge body movably disposed in the hinge receiving portion;
    a hinge head connected to the hinge body;
    a second member rotatably disposed on the first member and having a first fitting hole to receive the hinge head; and
    a base member disposed under the first member and having a retardant portion, wherein the hinge body is stopped by the retardant portion such that the hinge head connected thereto is received in the first fitting hole.

2. The pivot apparatus as claimed in claim 1, wherein the first member further comprises a rotating shaft opposite to the hinge receiving portion and the second member further comprises a second fitting hole opposite to the first fitting hole, the rotating shaft received in the second fitting hole.

3. The pivot apparatus as claimed in claim 1, wherein the second member further comprises an operation interface disposed thereon.

4. The pivot apparatus as claimed in claim 3, wherein the operation interface is a keypad module.

5. The pivot apparatus as claimed in claim 1, wherein the hinge body further comprises a spring disposed therein and connected to the hinge head.

6. A pivoting method for using in a portable electronic device including a first member and a second member, comprising the steps of:
    placing a hinge body into a hinge receiving portion of the first member, wherein the hinge body moves inside the first member;
    aiming a rotating shaft of the first member at a second fitting hole of the second member and fitting the rotating shaft into the second fitting hole;
    aiming the hinge receiving portion of the first member at a first fitting hole of the second member;
    pushing the hinge body in the hinge receiving portion toward the first fitting hole of the second member such that a hinge head connected to the hinge body moves into the first fitting hole; and
    fitting a base member on the bottom of the first member so that a retardant portion of the base member stops the hinge body, wherein the hinge head is received in the first fitting hole.

7. The pivoting method as claimed in claim 6, wherein the steps of aiming a rotating shaft at the second fitting hole and aiming the hinge receiving portion at the first fitting hole are performed simultaneously.

8. The pivoting method as claimed in claim 6, wherein the rotating shaft is opposite to the hinge receiving portion and the second fitting hole is opposite to the first fitting hole.

* * * * *